Aug. 2, 1955 T. R. BAKER 2,714,344
MACHINE FOR THE AUTOMATIC ASSEMBLY OF FOLDING
BOXES OF THE HOLLOW-WALLED TYPE
Filed Aug. 3, 1953 10 Sheets-Sheet 1

INVENTOR.
Thomas R. Baker

BY Howard G. Russell his ATTORNEY

Aug. 2, 1955  T. R. BAKER  2,714,344
MACHINE FOR THE AUTOMATIC ASSEMBLY OF FOLDING
BOXES OF THE HOLLOW-WALLED TYPE
Filed Aug. 3, 1953  10 Sheets-Sheet 2

INVENTOR.
Thomas R. Baker
BY
Howard G. Russell
his ATTORNEY

Aug. 2, 1955  T. R. BAKER  2,714,344
MACHINE FOR THE AUTOMATIC ASSEMBLY OF FOLDING
BOXES OF THE HOLLOW-WALLED TYPE
Filed Aug. 3, 1953  10 Sheets-Sheet 3

INVENTOR.
Thomas R. Baker
BY Howard G. Russell
his ATTORNEY

Aug. 2, 1955  T. R. BAKER  2,714,344
MACHINE FOR THE AUTOMATIC ASSEMBLY OF FOLDING
BOXES OF THE HOLLOW-WALLED TYPE
Filed Aug. 3, 1953  10 Sheets-Sheet 4

INVENTOR.
Thomas R. Baker
BY Howard G. Russell
his ATTORNEY

INVENTOR.
Thomas R. Baker
BY
Howard G. Russell
his ATTORNEY

INVENTOR.
Thomas R. Baker
BY
Howard G. Russell
his ATTORNEY

Aug. 2, 1955 T. R. BAKER 2,714,344
MACHINE FOR THE AUTOMATIC ASSEMBLY OF FOLDING
BOXES OF THE HOLLOW-WALLED TYPE
Filed Aug. 3, 1953 10 Sheets-Sheet 7

INVENTOR.
Thomas R. Baker
BY Howard G. Russell
his ATTORNEY

Aug. 2, 1955                T. R. BAKER                2,714,344
          MACHINE FOR THE AUTOMATIC ASSEMBLY OF FOLDING
                   BOXES OF THE HOLLOW-WALLED TYPE
Filed Aug. 3, 1953                                  10 Sheets-Sheet 9

INVENTOR.
Thomas R. Baker
BY Howard G. Russell
his ATTORNEY

United States Patent Office 2,714,344
Patented Aug. 2, 1955

2,714,344

MACHINE FOR THE AUTOMATIC ASSEMBLY OF FOLDING BOXES OF THE HOLLOW-WALLED TYPE

Thomas R. Baker, Los Altos, Calif., assignor, by mesne assignments, to Baljak Corporation, Wilmington, Del., a corporation of Delaware Application August 3, 1953, Serial No. 371,977

11 Claims. (Cl. 93—51)

The invention provides a machine for the automatic assembly of folding boxes of the hollow-walled type.

Hollow-walled folding boxes are favored for the packaging of merchandise for visual display since the appearance of the merchandise is enhanced by the decorative frame effect of the hollow box walls around it. In addition to the decorative merits, hollow-walled folding boxes offer cushioning support of the merchandise by reason of the air space in the hollow walls.

Hollow-walled folding boxes are mainly of two styles, depending on the shape of the box walls. The box walls may be of triangular cross-section, or they may be of square or rectangular cross-section.

As far as I am aware, it has been necessary in the past to assemble hollow-walled folding boxes by hand. The complexity of the box blank involving a great many wall panels, and generally also an intricate corner construction heretofore required manual assembly. Manual assembly is necessarily slow, and increases the cost of the box. The cost, in turn, limits the use of the box to fields where the correspondingly high cost of the box is justified. It is therefore desirable to reduce the cost of the box by eliminating the manual assembly.

The present invention provides a machine for the complete and automatic assembly of hollow-walled folding boxes from flat blanks fed into the machine. The machine is capable of being operated at high production rates of the general order of one hundred boxes per minute, more or less, depending on the size of the blank to be handled. The machine is quite compact and requires a floor space of generally less than 10 square feet.

While the invention can be adapted to the assembly of boxes of various sizes and cross-sectional shapes of the walls, it will be explained with particular reference to a very advantageous form of box blank which forms the subject matter of application Serial No. 322,610 of November 26, 1952.

The box blank may be set up into hollow-box forms by forcing it through a forming die, thereby causing the various panels and flaps of the box to assume the required position, and causing the corners of the box to be formed in such a way that the various panels are securely locked in their proper relationship.

Folding box machines of the plunger-and-die type are well known and are in common use for the assembly of folding boxes having walls of single or multiple thickness without air spaces between the thicknesses of the wall panels.

The present invention concerns a development and improvement of box machines of the plunger-and-die type to enable the machine to form boxes in which the side walls, or the end walls, or both the side walls and the end walls are hollow and, for example, of rectangular cross-section.

As will later be seen, the machine employs two plungers which alternately move the blank into and through the die. The plungers, the die, and associated elements perform various folding and locking operations on the box blank, so that the box leaving the machine is ready for filling with merchandise.

It is noteworthy that no extraneous securing means, such as adhesive, or staples, are required for assembling the box, but the box is gluelessly locked together.

It is well known that glued boxes must be kept under the control of the folding and gluing machine until the adhesive sets. This ordinarily involves conveyors of considerable length and results in a large machine. In the present case, the time required for setting of adhesive is eliminated. The distance of travel of the box blank is correspondingly shortened, and the size of the machine kept small.

The various aims, objects and advantages of this invention will appear more fully from the detailed description which follows, accompanied by drawings showing, for the purpose of illustration, a preferred embodiment of the invention. The invention also resides in certain new and original features of construction, combination and subcombination of elements, as hereinafter set forth and claimed.

Although the characteristic features of this invention which are believed to be novel will be particularly pointed out in the claims appended hereto, the invention itself, its objects and advantages, and the manner in which it may be carried out, may be better understood by referring to the following description taken in connection with the accompanying drawings forming a part of it, in which:

Figure 1:
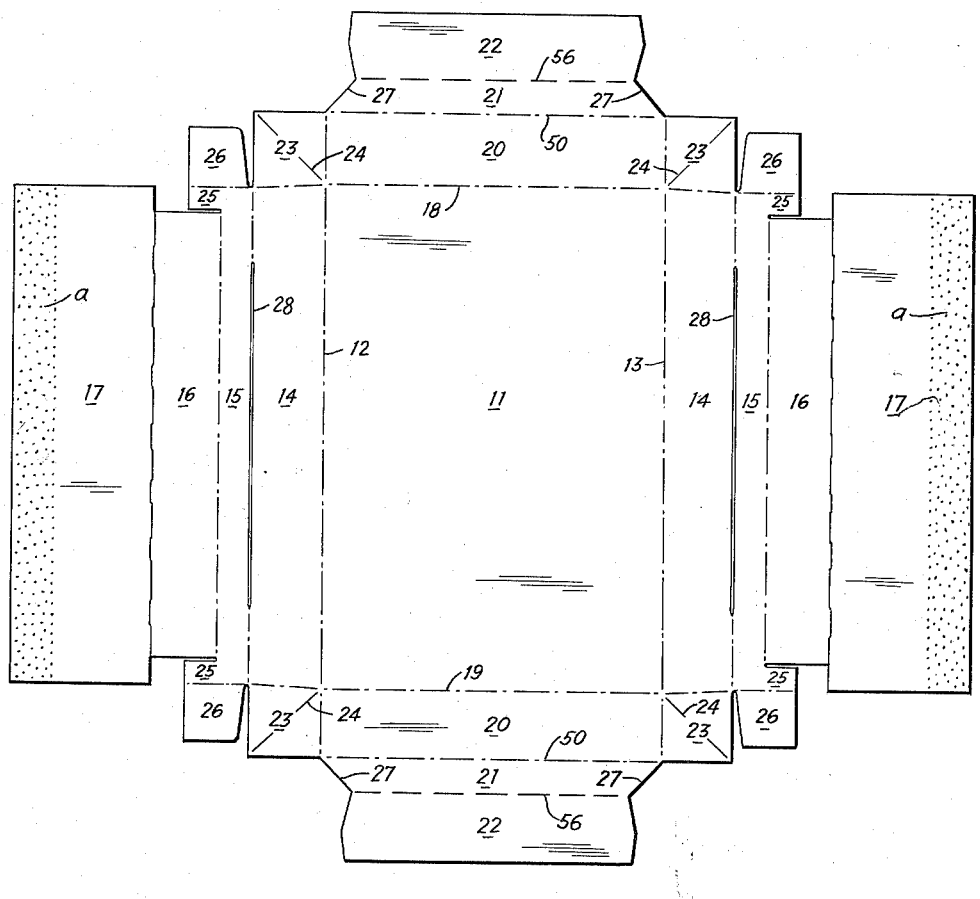
Fig. 1 is a plan view of a preferred form of box blank for a hollow-walled folding box.

In the following description and in the claims various details will be identified by specific numerals for convenience. The names, however, are intended to be generic in their application. Corresponding reference numerals refer to corresponding parts in the several figures of the drawings.

The drawings accompanying, and forming, part of this specification disclose certain specific details of the invention for the purpose of explanation of broader aspects, but it is understood that the details may be modified in various respects without departure from the broader aspects of the invention, and that the invention may be applied to other structures than the one shown.

The blank A shown in Fig. 1 is a preferred form of blank for constructing hollow-walled folding boxes and forms the subject matter of the aforementioned application, No. 322,610. The blank A comprises a main panel 11, to the side edges 12 and 13 of which side wall assemblies are articulated. The side wall assemblies comprise an outer side wall panel 14, a side top panel 15, an inner side wall panel 16 and a glue flap 17.

End wall assemblies extend from the end edges 18 and 19 of the main panel. These end wall assemblies comprise an outer end wall panel 20, and end top panel 21 and an inner end panel 22.

Gusset panels 23 are articulated to the outer side wall panels and to outer end wall panels, respectively, each gusset panel being bisected by a diagonal score line 24.

The side top panels 15 are provided with angular extensions 25. These extensions, as will later be seen, underlie the end top panels 21 in the finished box. The angular extensions 25 preferably have reinforcing and stiffening flaps 26 articulated to them. The end edges of the end top panels 21 are preferably mitered, as shown at 27, for the sake of appearance.

Figure 2:
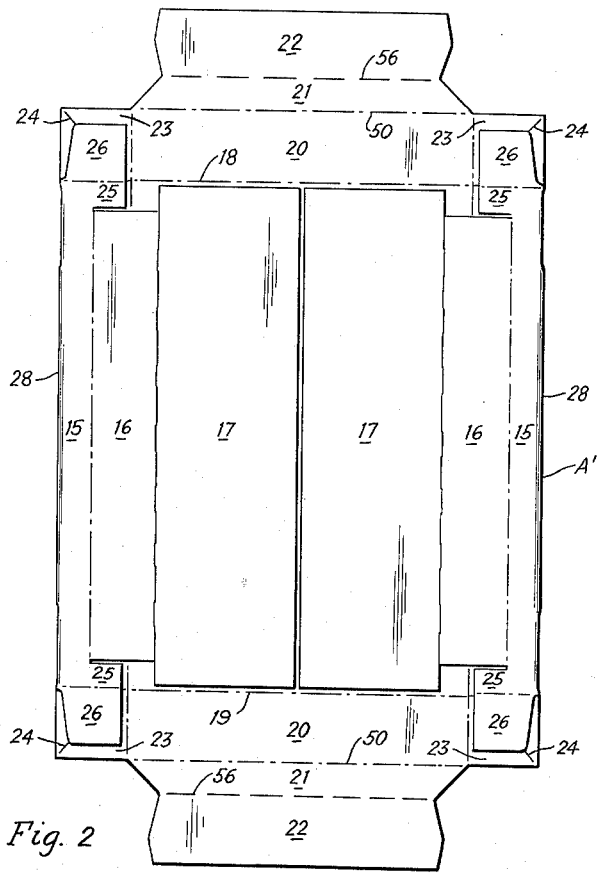
Fig. 2 is a plan view of a blank of Fig. 1 after an initial folding and gluing operation resulting in a flat blank structure ready for assembly into box form.

The cut and scored blanks are preferably pre-folded and pre-glued to produce the flat blank of Fig. 2. For this purpose adhesive "a" is applied to the glue flaps 17, as indicated in Fig. 1, and the blank is then folded along the crease lines 28 to bring the glue flaps 17 face to face, and into adhesive engagement with, the main panel 11. The resulting blank A' is partially of double thickness and is shown in Fig. 2. The portion of the blank which later forms the inside of the box faces the observer.

The blanks A' may be shipped and stored in collapsed flat condition and are ready for immediate assembly into hollow box form by an automatic folding box machine whose essential elements will now be described.

The general design of the folding box machine, except for the mechanisms for setting up the hollow box walls, may follow the design of the box machine disclosed in the patent to Baker and Pagendarm 2,624,249 dated January 6, 1953. The machine may be equipped with a practically frictionless blank magazine and suction feeder as disclosed in the patent to Baker and Pagendarm No. 2,642,285 dated June 16, 1953.

Figure 4:
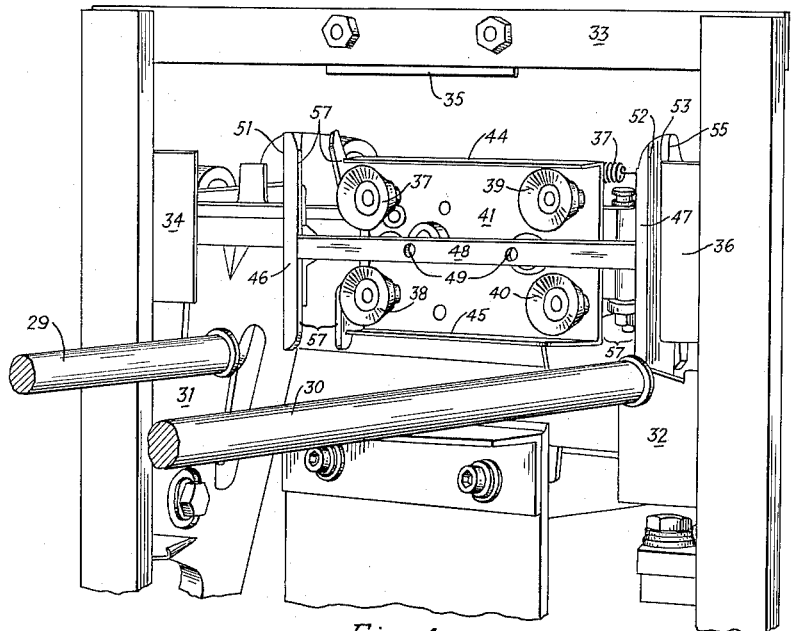
Fig. 4 is a perspective view of a blank magazine and feeder, looking at the bottom surface of the feeder.

Fig. 4 illustrates an empty blank magazine which comprises oscillating rods 29 and 30 for supporting box blanks. The rods are pivotally mounted in brackets 31 and 32 of magazine gate 33. The magazine gate has retaining blades 34, 35, 36 extending slightly into the path of blanks stacked on the rods 29 and 30 to prevent the frontmost blank from falling out of the gate.

Figure 5:
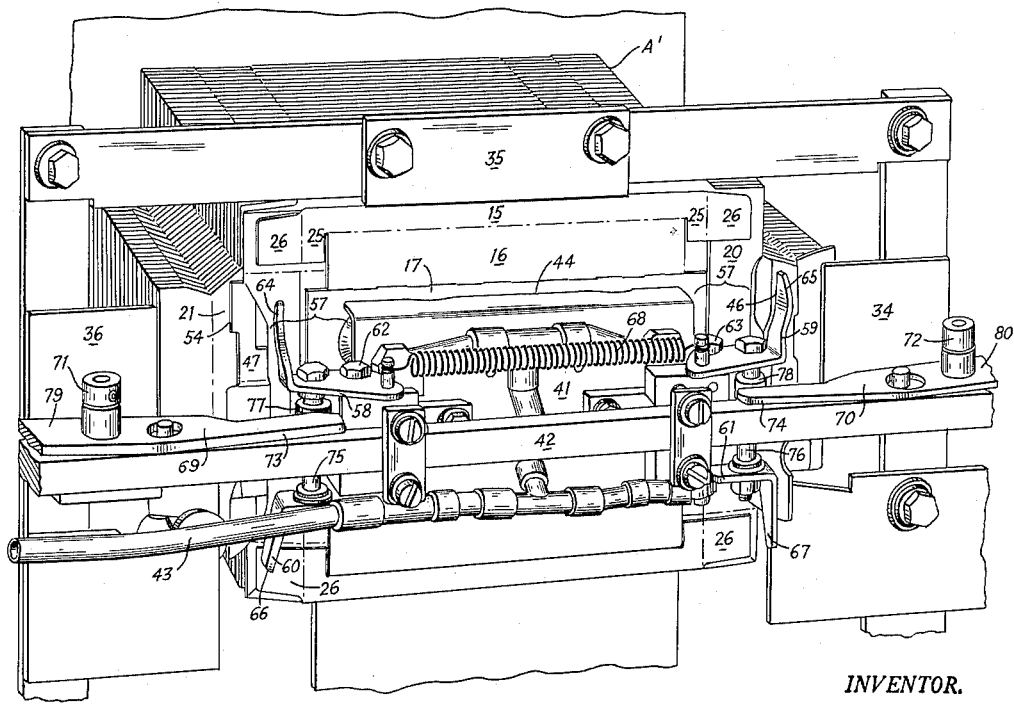
Fig. 5 is a perspective view of the magazine and feeder of Fig. 4, looking in the opposite direction, the magazine being filled with box blanks.

Turning now to Fig. 5 a stack of blanks A' is shown in the magazine, and it is seen how the blades 34, 35 and 36 engage the frontmost blank adjacent the edges and keep it securely within the magazine, yet permitting individual withdrawal of the frontmost blank in a manner which will now be described.

The blank feeder comprises one or several suction cups adapted to engage the frontmost blank in the stack and pull it past the edges of the blades 34, 35, and 36 by flexing the blanks slightly as seen in Fig. 5. The illustrated form of feeder has four suction cups 37, 38, 39 and 40. These suction cups are mounted on a plate 41 secured to an arm 42 capable of swinging between the magazine and a folding die forming part of the machine. The mechanism for actuating the swinging arm 42 is disclosed in greater detail in the aforementioned Baker and Pagendarm Patent 2,624,249. The suction cups are connected to a suitable suction pump (not shown) by a flexible hose 43 best seen in Fig. 5.

Turning to Fig. 4, the suction feeder also performs the function of a plunger for forcing the box blank into a forming die hereinafter described in greater detail. For this purpose the plate 41 is bent into a flat U-shape, the legs of the U forming two side rails or edges 44 and 45 adapted to bear against the blank adjacent the fold lines along which the glue flaps 17 are articulated to the inner side wall panels 16. It is therefore apparent that the distance between the side rails or edges 44 and 45 is slightly less than the distance between the inner side walls of the finished box.

The feeder-plunger is further equipped with end rails 46 and 47. In the illustrated embodiment the end rails 46 and 47 are welded to a central bar 48 to which the plate 41 is secured by bolts 49.

The end rails 46 and 47 are longer than the distance between the side rails 44 and 45, as is clearly apparent from Fig. 4. As is seen from Fig. 5, the end rails 46 and 47 engage the outer end wall panels 20 and the end top panels 21 of the blank adjacent the line of articulation 50 between these two panels.

The central bar 48 and a portion of the end rails 46 and 47 constitute a substantially flat, blank engaging surface extending to edges 51 and 52 beyond which the bottom surface of the end rails tapers upwardly, thereby forming a flat surface 53 inclined with respect to the bottom surface of the central bar 48. The spacing of the edges 51 and 52 is substantially equal to the spacing of the lines of articulation 50 of the blank. This arrangement permits the edges 51 and 52 to act as folding guides facilitating the accurate creasing of the blank along the fold lines 50 during the subsequent assembly procedure.

The end rails 46 and 47 are further provided with terminal edges 55 at the end of the inclined surface 53. The edge 55 lines up with the fold line 56 along which the panels 21 and 22 of the blank are articulated.

The length of the end rails 46 and 47 is greater than the distance between the side rails 44 and 45, and the end rails 46 and 47 are spaced apart farther than the length of the side rails 44 and 45. This arrangement leaves recesses or spaces 57 between the side rails and the end rails. As is apparent from Figures 7 and 8, the recesses 57 are in line with the angular extensions 25 of the side top panels 15, and permit erection of the side wall structures without interference to the angular extensions 25 by the feeder-plunger. Since the angular extensions 25 are in line with the end top panels 21 in the finished box, it may also be stated that the recesses 57 are in line with the end top panels 21, considering the box in erected position.

Folding arms 58, 59, 60 and 61 are pivotally mounted on the feeder-plunger for swinging movement about axes 62 and 63.

One end of the folding arms is angularly bent as shown at 64, 65, 66 and 67. The angularly bent ends of the folding arms are movable into the respective recesses 57 and serve to engage the reinforcing flap 26 on the angular extensions, as will later be seen.

Normally, the folding arms 58, 59, 60, 61 are maintained in raised position by a biasing spring 68. They may be swung in a downward direction toward the plate 41 by double-armed actuating levers 69 and 70 pivoted at 71 and 72 on the oscillating arm 42. The inner arms 73 and 74 of the actuating levers 69 and 70 engage connecting bars 75 and 76 of the folding arms 58, 60 and 59, 61, the connecting bars being fitted with ball bearings 77 and 78 on which the inner arms 73 and 74 rest.

The outer ends 79 and 80 of the actuating levers 69 and 70 carry studs 81 and 82 (Fig. 9) for engagement with posts 83 and 84 on the framework 85 on which the die assembly is mounted. As the oscillating arm 42 moves towards the die, the studs 81 and 82 strike the posts 83 and 84 and cause the actuating levers 69 and 70 to tilt about the respective pivots, thereby moving the folding arms 58, 59, 60, and 61 downwardly.

When the feeder-plunger is retracted from the die, the biasing spring 68 swings the folding arms 58, 59, 60 and 61 back into the position shown in Fig. 5.

The feeder-plunger performs a relatively complex movement between the magazine gate and the folding die which may be subdivided into three phases.

The first phase is a translatory motion in which the plunger approaches the magazine gate substantially in the direction of the stack of blanks resting in the magazine. At the end of this motion the suction cups grasp the frontmost blank, whereafter the feeder-plunger retracts, thereby pulling the frontmost blank past the retaining blades 34, 35 and 36, as shown in Fig. 5.

During the second phase of motion of the feeder-plunger, the oscillating bar 42 swings or oscillates about pivots 86 and 87 (Fig. 9) until the feeder-plunger is in line with the folding die.

During the third phase of motion, the feeder-plunger performs a translatory motion into and out of the folding die.

The mechanism for imparting this complex motion to the feeder-plunger is disclosed in greater detail in the aforementioned Baker and Pagendarm Patent 2,624,249.

Figure 6:
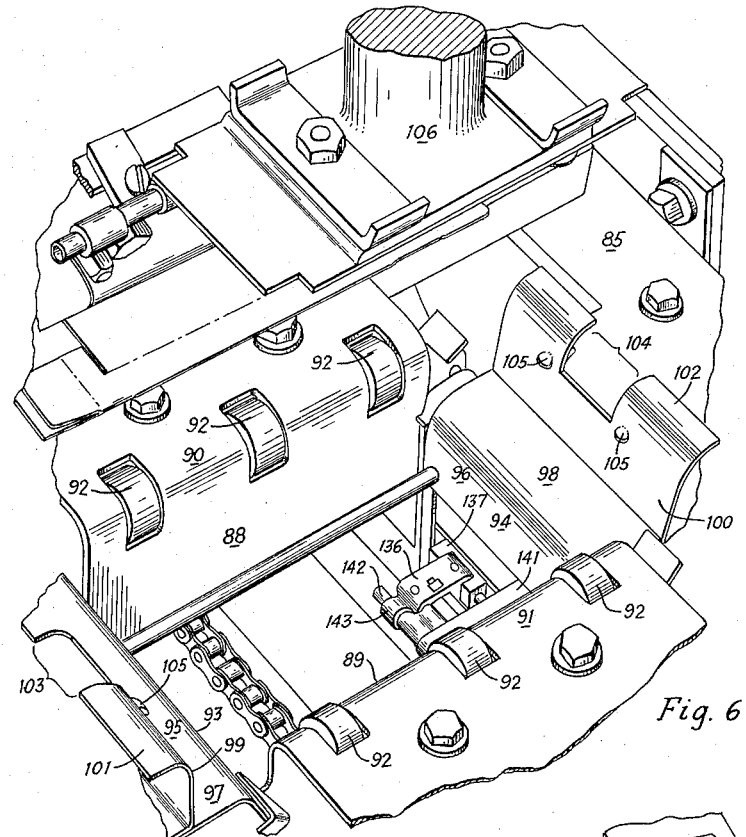
Fig. 6 is a perspective view of a preferred form of die for forming the blank into box shape.

The principal elements of the folding die are best seen in Fig. 6. The die comprises a pair of opposed substantially vertical die walls 88 and 89 for engaging the side wall assemblies of the box blank. The die walls are outwardly flared at 90 and 91 at the mouth of the die and rollers 92 serve to reduce the friction between the mouth of the die and an entering box blank.

A second pair of opposite die walls 93 and 94 serves to engage the end wall assemblies of the box blank. The die walls 93 and 94 proper are flared at 95 and 96 and terminate in a substantially horizontal shelf at 97 and 98 upon which certain panels of the box blank rest during the assembly, as will later be seen.

From the shelves 97 and 98 substantially vertical die wall portions 99 and 100 extend upwardly. The die elements 99 and 100 are flared at 101 and 102 to provide a mouth for the die walls 99 and 100. The flared portions are cut out at 103 and 104 to accommodate the oscillating arm 42 of the feeder-plunger in its lowermost position. Retaining buttons 105 are fitted in the outer die elements 99 and 100 to engage the outer edges of a partially inserted box blank to prevent the box blank from snapping out of the die during the return movement of the feeder-plunger, as will later be seen.

The die walls 88 and 89 which engage the side wall assemblies of the box are spaced a distance substantially equal to the distance of the outer side walls of the assembled box.

The die walls 93 and 94 which engage the end wall assemblies of the box are spaced a distance substantially equal to the outer end walls of the box.

The outer die walls 99 and 100 are spaced closer than the length of the blank, that is the distance from one edge of one end wall assembly of the blank to the corresponding edge of the other end wall assembly, considering the box blank in flat condition.

When the feeder-plunger moves towards the mouth of the folding die, the outer side walls 14 of the blank strike the mouth of the die, more particularly the flared portions 90, 91 and the friction reducing rollers 92. The blank, which is still held by the suction cups of the feeder-plunger, is further supported by the side rails or edges of the feeder-plunger of which one is visible at 45 in Fig. 7. The side rails or edges engage the blank immediately adjacent the lines along which the inner side panels 16 are articulated to the glue flaps 17. The side edges or rails 44 and 45 cause the inner side walls 16 to assume an upright position with regard to the bottom of the blank and similarly the outer side walls of the blank 14 assume an angular position in regard to the bottom panel 11 of the blank when the blank enters the mouth of the die.

The angular extensions 25 of the blank move into the recesses or spaces 57 of the die between the end rails 46 and 47 and the side rails 44 and 45, respectively.

Figure 7:
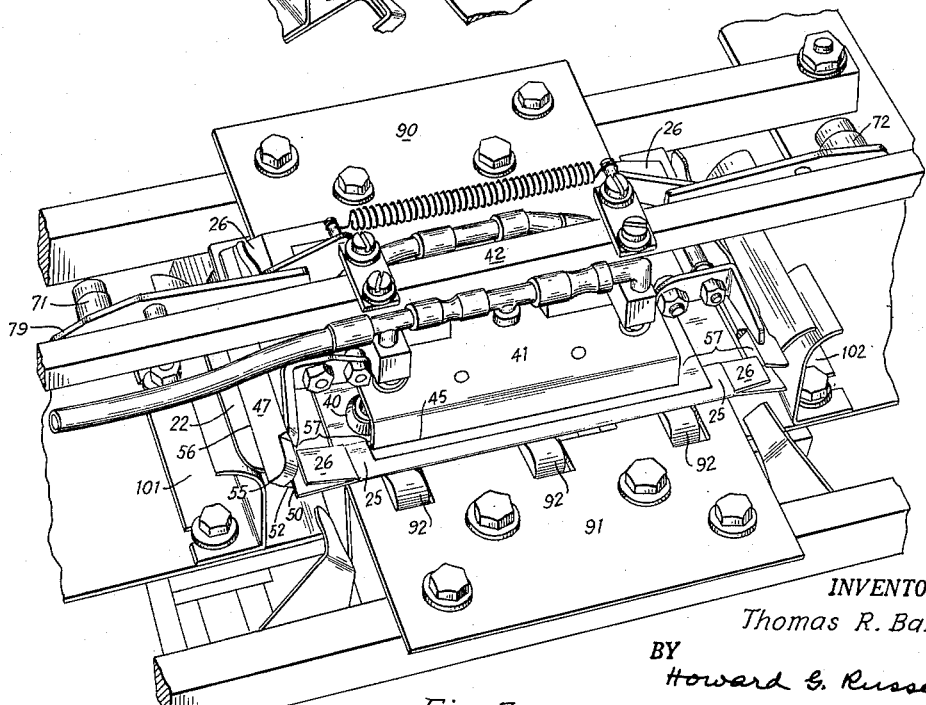
Fig. 7 is a perspective view of the feeder-plunger and die during the initial stage of erection of the box blank.

Substantially simultaneously, the inner end panels 22 of the blank strike the flared portions 101 and 102 of the die and are folded to an upwardly slanting position in regard to the bottom of the blank. The edges of the end rails, three edges being visible at 51, 52 and 55 in Fig. 4, engage the fold lines 50 and 56 bordering the end top panel 21 and cause both folding creases to break. Fig. 7 illustrates the position of the blank during the prebreaking of the folding creases.

Figures 8, 9:
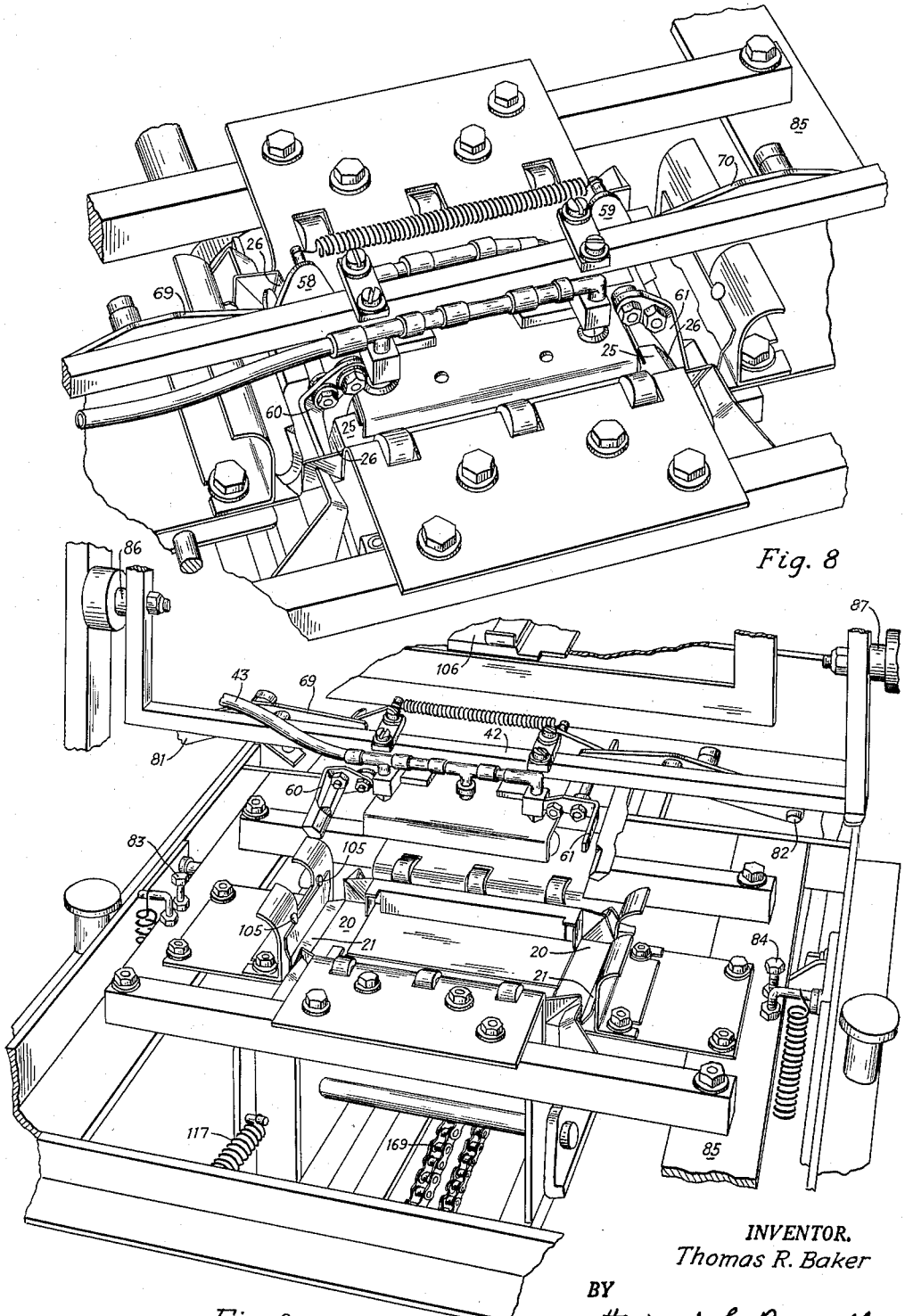
Fig. 8 is a perspective view of the feeder-plunger and the die at a further advanced stage of the assembly.
Fig. 9 is a perspective view of a die after withdrawal of the feeder-plunger, and prior to engagement of the blank by a second plunger.

As the feeder-plunger approaches the lowest position with respect to the folding die, the side wall assemblies of the box blank are fully squared and erected. During the last portion of this downward stroke, the actuating levers 69 and 70 strike the respective posts 83 and 84 visible in Fig. 9 and cause the folding arms 58, 59, 60, and 61 to swing downwardly, thereby striking the reinforcing flaps 26 and folding them into substantially rectangular positions with regard to the angular extensions 25 from which they depend. Fig. 8 illustrates the position of the arms 58, 59, 60 and 61 in which the reinforcing flaps 26 have almost reached their final position.

The folding of the reinforcing flaps 26 completes the operations performed by the feeder-plunger, which then retracts as shown in Fig. 9. It will be noted that the end edges of the inner end wall panels have snapped past the retaining buttons 105 which lock the blank in the die in a position in which the panels 20 and 21 overlie the aforementioned horizontal shelves 97 and 98 (Fig. 6) of the die.

The feeder-plunger now returns to the magazine to pick up the next blank, and a second plunger 106 descends to perform further folding operations on the blank.

During the period of withdrawal of the feeder-plunger (Fig. 9) and prior to engagement of the blank by the descending second plunger (Fig. 10), the gusset panels 23 of the blank are folded sufficiently to insure proper formation of the corner gussets.

Figure 16:
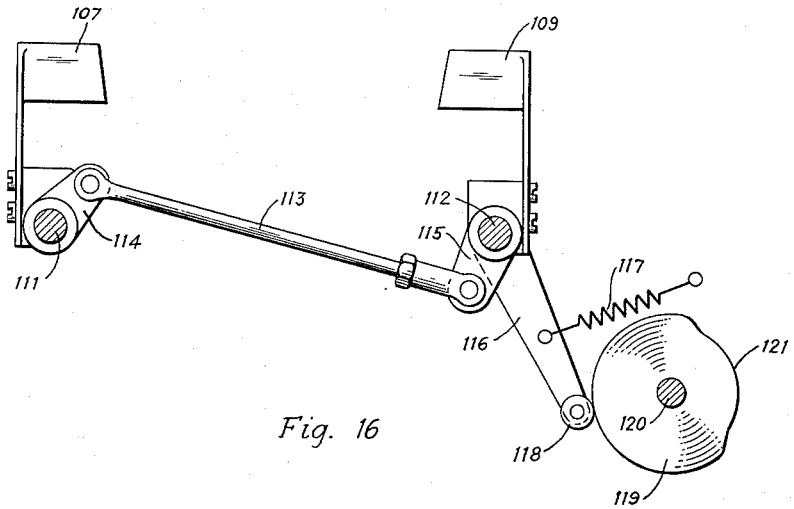
Fig. 16 illustrates the action of the gusset folding mechanism.

For this purpose four folding blades 107, 108, 109 and 110 are provided which engage the gusset panels 23 along their diagonal score lines. The action of the gusset folders is illustrated in Fig. 16.

The folding blades are mounted on shafts 111 and 112 which are interconnected by a rod 113 hingedly connected to cranks 114 and 115 on the shafts 111 and 112, respectively. The shaft 112 has an actuating lever 116 secured to it which is biased for counterclockwise rotation by a spring 117. The end of the lever carries a roller 118 resting against a cam 119 on a shaft 120 which is a part of the machine drive.

Figure 10:
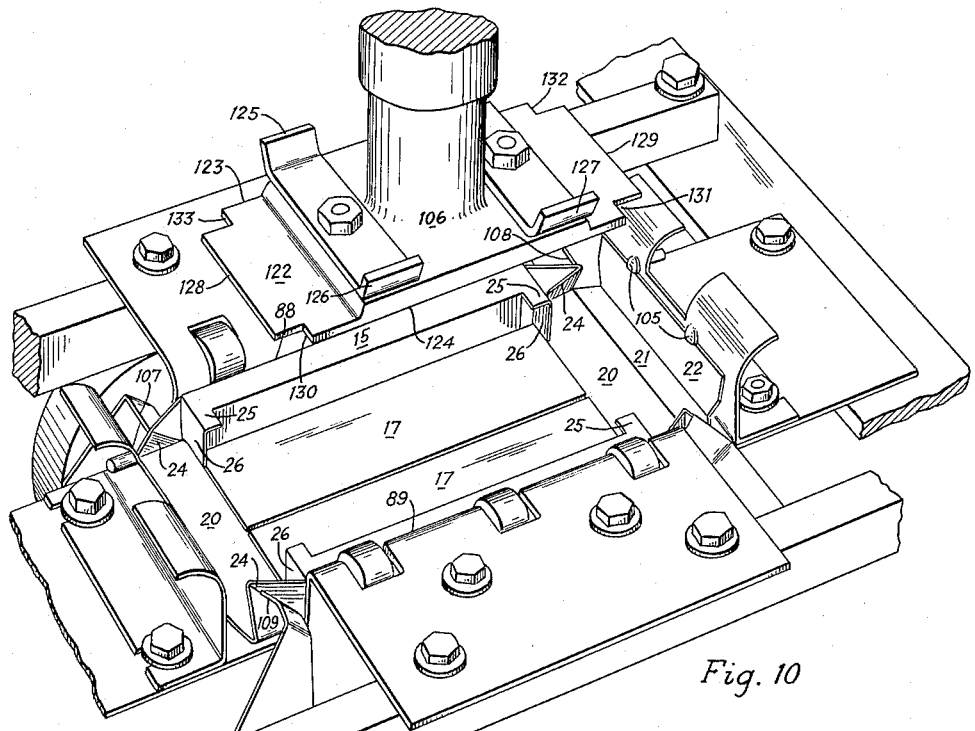
Fig. 10 illustrates the position of the plungers slightly advanced with regard to the position of Fig. 9.

The cam normally maintains the folding blades in disengaged position. When the low portion 121 of the cam bears against the roller, the shaft 112 turns counterclockwisely and the shaft 111 turns in the opposite direction under the action of the spring 117. This causes the blades 107, 109 and 108, 110 to move towards each other, thereby initiating the folding of the gusset panels along their diagonal score lines 24. Fig. 10 illustrates this stage of the folding operations and also shows details of the plunger 106 about to engage the partially folded blank in the die.

The plunger 106 comprises a base plate 122 whose side edges 123 and 124 are spaced apart slightly less than the distance between the inner side walls 16 of the partially erected blank. Sufficient clearance is provided to insure that the base plate 122 of the plunger comes to rest on the bottom panel and the overlying glue flaps 17 of the blank without striking the erected side walls.

The plunger is provided with upper box side wall engaging portions or surfaces of which three are visible at 125, 126 and 127. These surfaces taper upwardly and outwardly and their uppermost portions engage the inner side walls 16 of the box adjacent the side top panels 15, as is particularly well shown in Fig. 11. The upper, box side wall engaging portions of the plunger are spaced from the die walls 88 and 89 a distance which is substantially equal to the thickness of the hollow side walls of the box. This construction of the plunger assures accurate squaring of the side wall structures.

The end edges 128 and 129 of the second plunger 106 are spaced apart a distance which is substantially equal to the length of the bottom panel of the box. The edges 128 and 129 thus engage the blank in the die immediately adjacent the lines along which the outer end wall panels 20 are articulated to the bottom panel and insure accurate folding of the blank along that line.

The four corners of the base plate 122 are cut out, as seen at 130, 131, 132 and 133, the cut-back being sufficient to cause the plunger to clear the four angular extensions 25 on the side top panels 15 safely.

Figure 11:
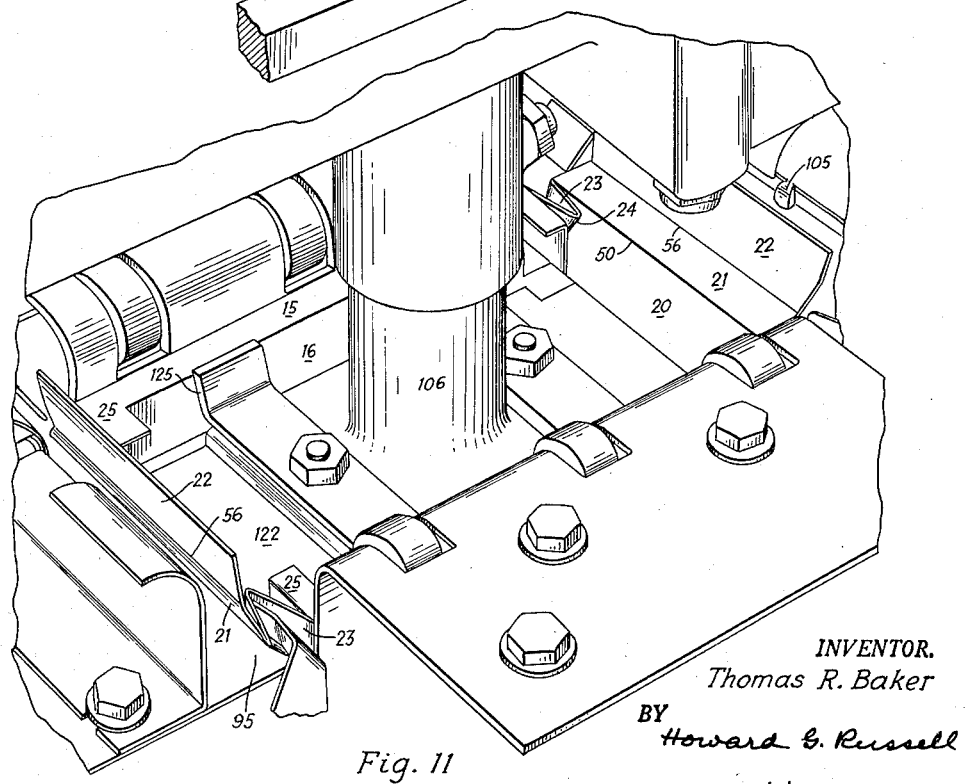
Fig. 11 shows the second plunger in engagement with a blank.
Figure 15:
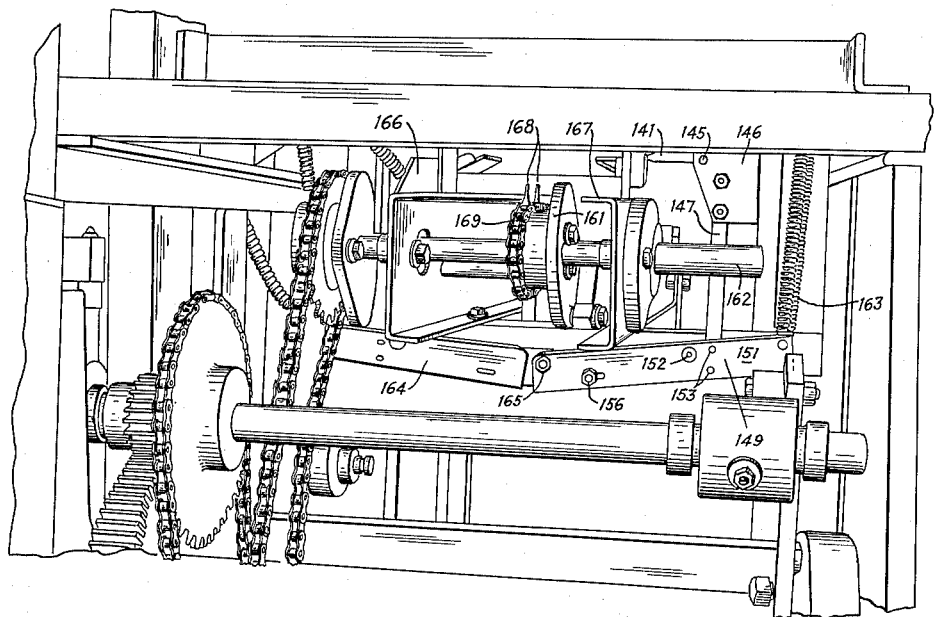
Fig. 15 is a perspective view of that portion of the machine which includes the forming mechanism of Fig. 14.

Fig. 11 illustrates the position of the plunger 106 shortly after engagement with the box blank. At this point the end wall assemblies of the blank are about to enter the mouth of the lower portion of the die. The downward movement of the blank causes the inner end panels 22 to disengage from the retaining button 105. As is apparent from the drawing, the pre-breaking of the fold lines 50 and 56 has caused the panels 20, 21 and 22 to assume a definite angular position with respect to one another. The downward movement of the blank into the lower portion of the die causes the gusset panels 23 to fold tightly, and the blank finally comes to rest on rails 166, 167 (Fig. 15) within the lower portion of the die, whereafter the second plunger 106 recedes. Fig. 11 illustrates this phase of the operation at which the blank is ready for completion of the end wall assemblies by a hollow end walling mechanism which forms the subject matter of a copending application Ser. No. 371,883.

The assembly of the end walls involves folding of the inner end wall panel 22 into a position in which it is upright with respect to the bottom of the box, and spaced from and parallel with, the outer end wall panel 20. In this position the end top panel 21 overlies the angular extensions 25 of the side top panels 15.

The folding mechanism includes a pair of oppositely disposed folding blades 134 which are mounted to perform a relatively complex folding operation. This operation is distinct from the common double-walling operations known in the folding box art in that the inner end wall is brought into a position in which it is parallel with, but spaced from, the outer end wall.

Figure 14:
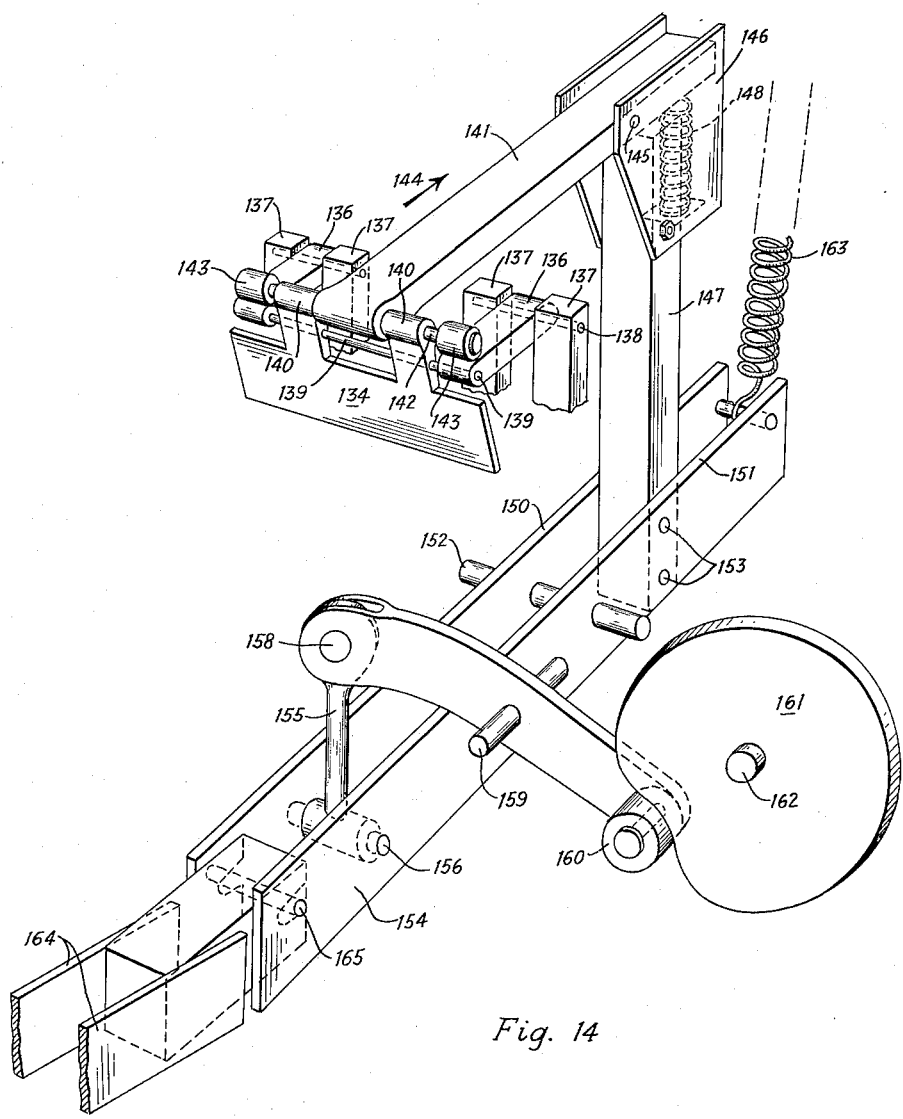
Fig. 14 is a perspective view of the mechanism for forming the end walls.

The construction and operation of the folding blades 134 are best illustrated by reference to Fig. 14.

A pair of links 136 is hingedly mounted to posts 137 at a hinge axis 138. The posts 137 are in back of the plane of the die walls 93 and 94 and are visible in Fig. 6.

Figure 17:
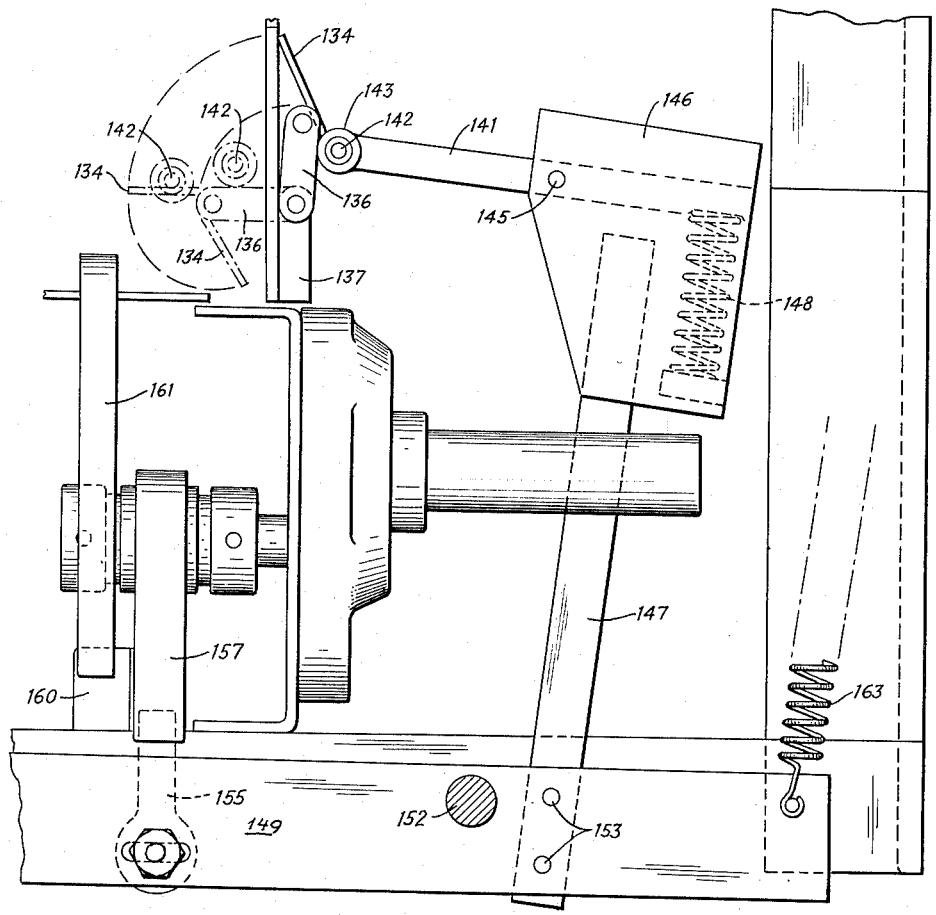
Fig. 17 illustrates the action of the hollow end walling mechanism of the machine.

The folding blade 134 is hingedly mounted to the links 136 for freedom to pivot about a tilt axis 139. The tilt axis 139 extends centrally through the body of the blade 134, so that a double armed lever results, the lower portion of which is the blade 134 proper, and the upper portion of which is a second arm 140 to which an actuating arm 141 is linked at a hinge axis 142. The hinge axis 142 is formed by a rod carrying rollers 143 at its ends. These rollers come to rest on the links 136 when the actuating arm 141 is moved in the direction of the arrow 144. In that case the rollers 143 become stops which limit the angular movement of the blade 134 with regard to the direction of the links 136. The preferred arrangement is one in which the blade 134 only forms a slight angle with respect to the links 136 when the blade is being retracted. This is illustrated in Fig. 17.

The actuating arm 141 is pivotally supported at 145 in the head 146 of a post 147. A spring 148 tends to tilt the actuating arm 141 with respect to the post 147 in a direction to swing the links 136 downwardly which is also the direction in which the blank moves through the die.

An arm 149 consisting of parallel bars 150 and 151 is pivotally mounted in the machine on a shaft 152. The post 147 is secured to the arm 149 at 153 and rocks back and forth when the near end 154 of the arm 149 moves up and down.

A connecting rod 155 is hinged to the arm 149 at 156 and is linked to one arm of a rocking lever 157 at 158. The lever 157 has a tilt axis 159, and its free end carries a roller 160 resting against the periphery of a cam 161 on a drive shaft 162.

The arm 149 is under the action of a spring 163 tending to pull the near end 154 down, thereby maintaining the roller 160 in engagement with the cam 161.

A second similarly constructed arm 164 is coupled to the arm 149 at 165 and actuates a further assembly for operating an opposite folding blade which is not visible in the figures. The opposite blade folds the opposite end wall assembly of the blank.

The operation of folding blades is best illustrated in Fig. 17 where the two extreme positions of the blade 134 are indicated together with an intermediate position. The post 147 is shown in the position in which the blade 134 is fully retracted. In this position the link 136 is upright and the roller 143 rests on the link. The upright position of the blade 134 is maintained by the spring 148 tending to tilt the arm 141 downwardly.

As the arm 149 tilts counterclockwisely, the post 147 and the arm 141 move towards the die, causing the link 136 to swing into the throat of the die. After the link 136 has assumed a right angular position with respect to the die wall, further movement of the arm 141 causes the blade 134 to tilt relatively to the link and assume a position slightly inclined towards the vertical. This causes the inner end wall of the blank to fold somewhat beyond the vertical position, so as to snap past the end edges of the inner side wall panels 16 which lock the inner end wall in place.

Figure 12:
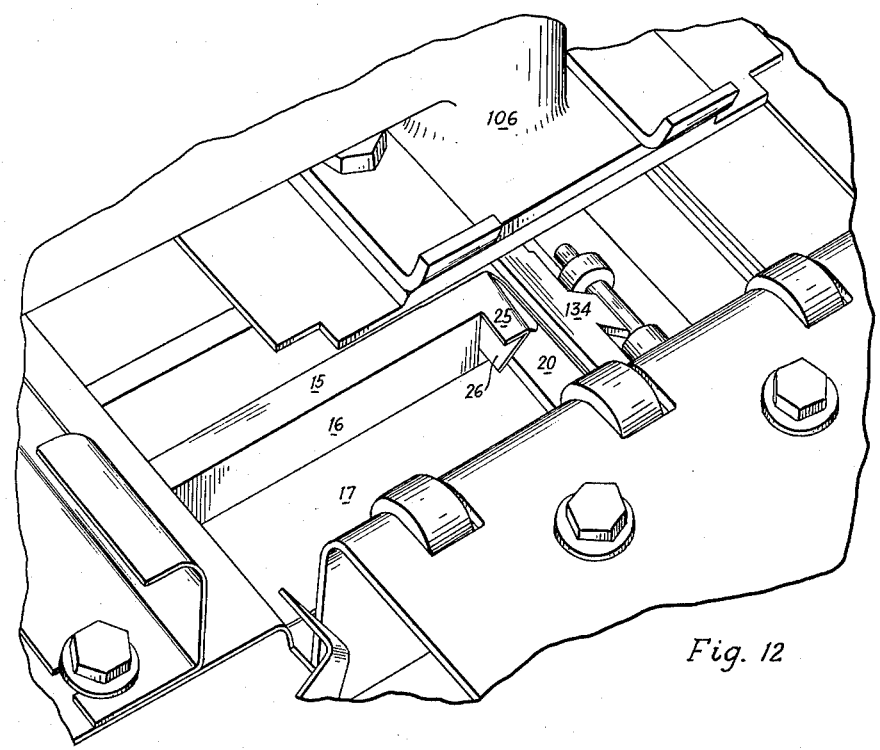
Fig. 12 shows the blank in the throat of the die during the initial stage of the formation of the end walls.

Turning now to Fig. 12, the blade 134 is shown in the intermediate position indicated in Fig. 17. The infolding of the inner end panel 22 commences at this point.

Figure 13:
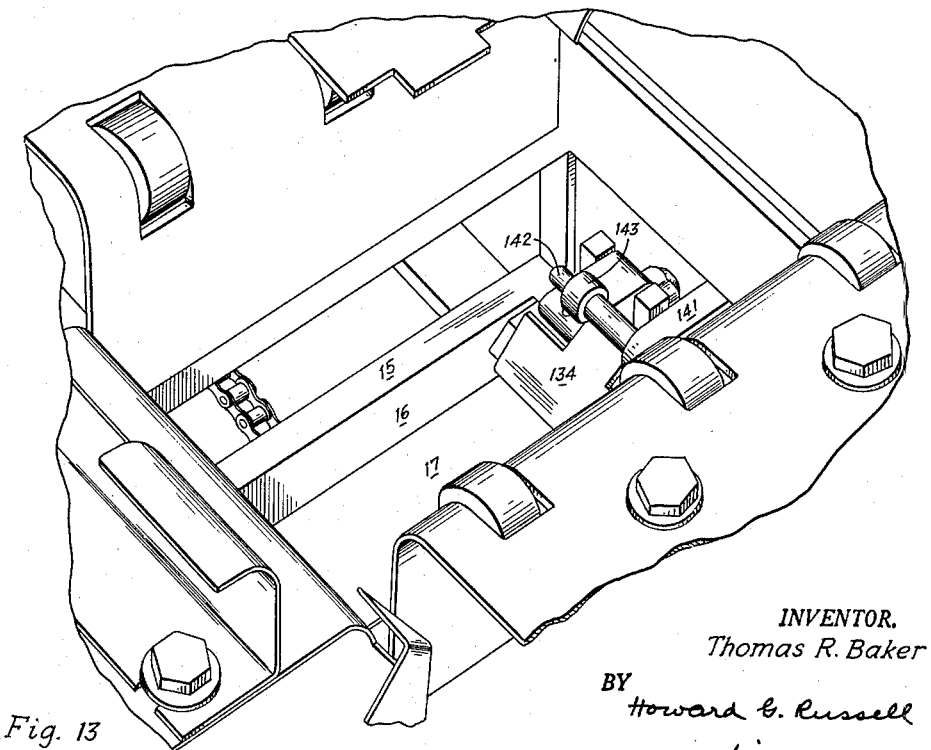
Fig. 13 shows the blank at a further advanced stage of assembly of the end walls.

Figure 13 shows the blade 134 in a further advanced position in which the links 136 overlie the end top panel and the inner end panel 22 has almost assumed a vertical position.

After the end walls of the box are completed the end wall folding blades swing out of the throat of the die. The finished box rests on the rails 166, 167 and is grasped by the lugs 168 of a conveyor 169 (Fig. 15) which moves the box to the end of the rails where the box drops into a suitable chute or receptacle (not shown).

Figure 3:
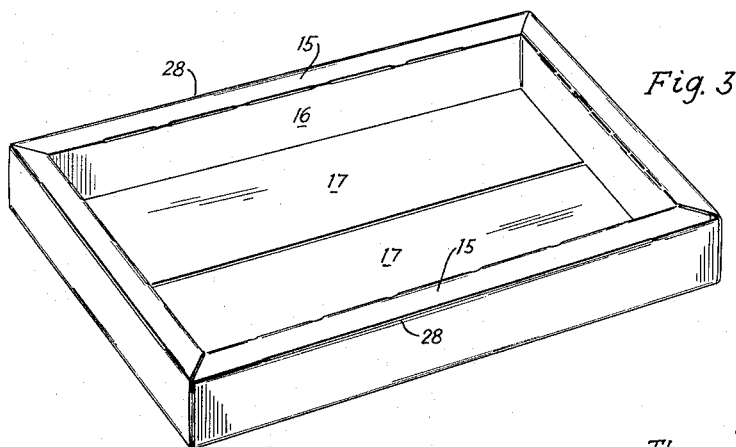
Fig. 3 is a perspective view of the completed box.

The completed box is shown in Fig. 3 and is ready for filling with merchandise.

What is claimed is:

1. A device for setting up hollow-walled folding boxes from flat blanks, the device comprising a plunger and a die, the plunger comprising a central portion having lateral edges spaced less than the distance between the inner side walls of the box, and end extensions of said central portion, said end extensions being spaced apart wider than the distance between the inner end walls of the box and being longer than the distance between said lateral edges, said plunger having recesses between said central portion and said extensions, said recesses being in line with the top end walls of the box; said die comprising side folding members and end folding members constituting a throat into which the blank may be forced by the plunger, said side folding members being spaced not less than the distance between the outer side walls of the box, said end folding members being spaced farther than the distance between the ends of said extensions.

2. A device for setting up hollow-walled folding boxes from flat blanks, the device comprising a plunger and a die, the plunger comprising a central portion having lateral edges spaced less than the distance between the inner side walls of the box, and end extensions of said central portion, said end extensions being spaced apart wider than the distance between the inner end walls of the box and being longer than the distance between said lateral edges, said plunger having recesses between said central portion and said extensions, said recesses being in line with the top end walls of the box; said die comprising side folding members and end folding members constituting a throat into which the blank may be forced by the plunger, said end folding members being stepped and comprising an upper portion within which the end folding members are spaced farther than the ends of said extensions, and a lower portion within which the end folding members are spaced less than the distance between the ends of said extensions, said side folding members being spaced not less than the distance between the outer side walls of the box.

3. A device for setting up hollow-walled folding boxes from flat blanks, the device comprising a plunger and a die, the plunger comprising a central portion having lateral edges spaced less than the distance between the inner side walls of the box, a suction cup for gripping the blank between said lateral edges, and end extensions of said central portion, said end extensions having terminal edges substantially in line with the lines of articulation between the top end walls and the inner end walls of the blank and further edges parallel to the said terminal edges, said further edges being substantially in line with the line of articulation between the outer end wall and the top end wall, the bottom surface of the extensions being sloped upwardly from said further edges to said terminal edges; said plunger having recesses between said central portion and said extensions, said recesses being in line with the top end walls of the box; said die comprising side folding members and end folding members constituting a throat into which the blank may be forced by the plunger, said side folding members being spaced not less than the distance between the outer side walls of the box, said end folding members being spaced farther than the distance between the ends of said extensions.

4. A device for setting up hollow-walled folding boxes from flat blanks, the device comprising a plunger and a die, the plunger comprising a central portion having lateral edges spaced less than the distance between the inner side walls of the box, and end extensions of said central portion, said end extensions being spaced apart wider than the distance between the inner end walls of the box and being longer than the distance between said lateral edges, said plunger having recesses between said central portion and said extensions, said recesses being in line with the top end walls of the box; said die comprising side folding members and end folding members constituting a throat into which the blank may be forced by the plunger, said side folding members being spaced not less than the distance between the outer side walls of the box, said end folding members being spaced farther than the distance between the ends of said extensions, said side folding members terminating short of said end folding members to provide spaces therebetween; and folding elements in said spaces movable towards, and away from, the throat of the die.

5. A plunger for setting up hollow-walled folding boxes from flat blanks by forcing the blanks into a die, the plunger comprising a central portion having lateral edges spaced less than the distance between the inner side walls of the box, and end extensions of said central portion, said end extensions being spaced apart wider than the distance between the inner end walls of the box and being longer than the distance between said lateral edges, said plunger having recesses between said central portion and said extensions, said recesses being in line with the top end walls of the box, and folding arms pivotally mounted on said plunger above said recesses for swinging movement downwardly towards said central portion.

6. A plunger for setting up hollow-walled folding boxes from flat blanks by forcing the blanks into a die, the plunger comprising a central portion having lateral edges spaced less than the distance between the inner side walls of the box, and end extensions of said central portion, said end extensions being spaced apart wider than the distance between the inner end walls of the box and being longer than the distance between said lateral edges, said plunger having recesses between said central portion and said extensions, said recesses being in line with the top end walls of the box, and folding arms pivotally mounted on said plunger above said recesses, and means operable in dependence on the movement of the plunger with respect to the die for moving said folding arms downwardly towards said central portion.

7. A plunger for setting up hollow-walled folding boxes from flat blanks by forcing the blanks into a die, the plunger comprising four folding rails arranged in the form of a rectangle, the end rails being longer than the distance between the side rails, the side rails being shorter than the distance between the end rails, so as to leave a space between the side rails and the end rails; suction cups within the space between the side rails; and folding arms mounted for pivotal movement in a plane normal to the plane defined by said rails, said folding arms being mounted above the spaces between the side rails and the end rails, so as to swing downwardly into said last named spaces towards said suction cups.

8. A device for setting up hollow-walled folding boxes from flat blanks, the device comprising a die and a plunger, the die having a substantially rectangular throat of a certain width and length through which the blank may be forced; the plunger comprising two end rails, and two side rails arranged in the form of a rectangle, the end rails being longer than the width of the throat, and spaced apart farther than the length of the throat, the side rails being shorter than the length of the throat and spaced apart less than the width of the throat.

9. A device for setting up hollow-walled folding boxes from flat blanks, the device comprising a die and two plungers successively movable into, and out of, said die, the die having a substantially rectangular throat constituting its lower portion, said throat being of a certain width and length, said die having an upper portion whose width is substantially equal to the width of the throat, and whose length is greater than the length of the throat, the die therefore being stepped with regard to the dimensions of length; the first plunger comprising two end rails and two side rails arranged in the form of a rectangle, the end rails being longer than the width of the throat and spaced apart farther than the length of the throat, but less than the length of said upper portion, the side rails being shorter than the length of the throat and spaced apart less than the width of the throat; the second plunger having a substantially rectangular base surface of dimensions smaller than the dimensions of the throat; and means for moving said first plunger and said second plunger into and out of said die one after the other, the stroke of the first plunger with regard to entry of the die being less than the stroke of the second plunger.

10. A device for setting up hollow-walled folding boxes from flat blanks the device comprising a die and two plungers successively movable into, and out of, said die, the die having a substantially rectangular throat constituting its lower portion, said throat being of a certain width and length, said die having an upper portion whose width is substantially equal to the width of the throat, and whose length is greater than the length of the throat, the die therefore being stepped with regard to the dimensions of length; the first plunger comprising two end rails and two side rails arranged in the form of a rectangle, the end rails being longer than the width of the throat and spaced apart farther than the length of the throat, but less than the length of said upper portion, the side rails being spaced apart less than the width of the throat; the second plunger having a substantially rectangular base surface smaller than the corresponding dimensions of the throat, the clearance of each side edge of the second plunger with regard to the lower portion of the die being more than the thickness of the hollow side wall of the box, the clearance of each end edge of the second plunger with respect to the lower portion of the die being less than the thickness of the hollow end wall of the box; and means for moving said first plunger and said second plunger into and out of said die one after the other, the stroke of the first plunger with regard to entry of the die being less than the stroke of the second plunger.

11. A device for setting up hollow-walled folding boxes from flat blanks, the device comprising a die and two plungers successively movable into, and out of, said die, the die having a substantially rectangular throat constituting its lower portion, said throat being of a certain width and length, said die having an upper portion whose width is substantially equal to the width of the throat, and whose length is greater than the length of the throat, the die therefore being stepped with regard to the dimensions of length; the first plunger comprising two end rails and two side rails arranged in the form of a rectangle, the end rails being longer than the width of the throat and spaced apart farther than the length of the throat, but less than the length of said upper portion, the side rails being spaced apart less than the width of the throat; the second plunger having a substantially rectangular base surface smaller than the corresponding dimensions of the throat, the sides of the second plunger including a lower box side wall clearing portion, and an upper box side wall engaging portion said last named upper portion having a clearance with respect to the die of more than the thickness of the hollow side wall of the box, the ends of the second plunger having a clearance with respect to the lower portion of the die of less than the thickness of the hollow end wall of the box, the four corners of the second die being cut out more than the thickness of the box walls at the corner; and means for moving said first plunger and said second plunger into and out of said die one after the other, the stroke of the first plunger with regard to entry of the die being less than the stroke of the second plunger.

References Cited in the file of this patent

UNITED STATES PATENTS

| | | |
|---|---|---|
| 2,614,466 | Palmer | Oct. 21, 1952 |
| 2,655,843 | Baker et al. | Oct. 20, 1953 |
| 2,669,167 | Behl | Feb. 16, 1954 |